US 8,694,538 B1

(12) United States Patent
Sharma et al.

(10) Patent No.: US 8,694,538 B1
(45) Date of Patent: Apr. 8, 2014

(54) METHOD AND APPARATUS FOR LOGGING WRITE REQUESTS TO A STORAGE VOLUME IN A NETWORK DATA SWITCH

(75) Inventors: Gopal Sharma, San Jose, CA (US);
Santosh S. Rao, Santa Clara, CA (US);
Amitava Guha, San Jose, CA (US);
Raghu Krishnamurthy, Santa Clara, CA (US); Múkul Kumar, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 1358 days.

(21) Appl. No.: 10/871,827

(22) Filed: Jun. 18, 2004

(51) Int. Cl.
*G06F 17/30* (2006.01)
*G06F 15/173* (2006.01)

(52) U.S. Cl.
USPC .......................... 707/770; 709/226; 709/229

(58) Field of Classification Search
USPC ........... 709/217, 223, 224, 227, 229; 707/770
See application file for complete search history.

(56) References Cited

U.S. PATENT DOCUMENTS

| | | | |
|---|---|---|---|
| 5,640,561 A * | 6/1997 | Satoh et al. | 707/202 |
| 6,629,264 B1 * | 9/2003 | Sicola et al. | 714/15 |
| 7,433,948 B2 * | 10/2008 | Edsall et al. | 709/224 |
| 2003/0014432 A1 * | 1/2003 | Teloh et al. | 707/204 |
| 2004/0143702 A1 * | 7/2004 | Valdevit | 711/111 |
| 2006/0095960 A1 * | 5/2006 | Arregoces et al. | 726/11 |

* cited by examiner

*Primary Examiner* — Vincent F Boccio
(74) *Attorney, Agent, or Firm* — Campbell Stephenson LLP

(57) ABSTRACT

A method and apparatus for logging write requests to a storage volume in a network data switch is described. In one example, a switch component in a switch receives a write request from a host server. The write request is associated with a destination in the storage volume. A logging element is identified that is associated with the destination of the write request. The logging element may be a switch component in the switch (e.g., a virtualization card), or may be dedicated logging circuitry in the switch. The identified logging element then logs a write intent for the destination in a log.

20 Claims, 5 Drawing Sheets

METHOD AND APPARATUS FOR LOGGING WRITE REQUESTS TO A STORAGE VOLUME IN A NETWORK DATA SWITCH

BACKGROUND OF THE INVENTION

1. Field of the Invention

The present invention relates to high-availability data storage systems and, more particularly, to a method and apparatus for logging write requests to a storage volume in a network data switch.

2. Description of the Background Art

Modern computer networks generally comprise a plurality of user computers connected to one another and to a computer server via a communication network. To provide redundancy and high-availability of the information in applications that are executed upon the computer server, multiple computer servers maybe arranged in a cluster, i.e., forming a server cluster. Such server clusters are available under the trademark VERITAS CLUSTER SERVER from Veritas Software Corporation at Mountain View, Calif. In a center of a cluster, a plurality of servers communicate with one another to facilitate failover redundancy such that when software or hardware, i.e., computer resources, become inoperative on one server, another server can quickly execute the same software that was running on the inoperative server substantially without interruption. As such, user services that are supported by a server cluster would not be substantially impacted by inoperative server or software.

Within a server cluster, the servers are generally connected to at least one switch that controls routing of data to/from one or more storage volumes. Each switch contains a plurality of switch components that facilitate routing data and read/write requests to and from the storage volume or volumes. The switch component comprises a computer processor that executes storage volume manager software containing a virtualization engine. These "intelligent" switch components are henceforth also referred to as DPCs (Data Path Controller). One example at storage volume manager software is the VERITAS VOLUME MANAGER (VxVM) available from Veritas Software Corporation of Mountain View, Calif. The virtualization engine provides virtual logic units (VLUNs) that are mapped to the various physical logical units of the storage volumes. Such virtualization enables the server to address the storage volume through the use of VLUNs.

Within a switch, it is desirable to log write requests for the storage volumes. Notably, an intention to write data to a storage volume may be logged upon receiving a write request from each server coupled to the switch. This allows for fast recovery of a storage volume in the event a server or the switch crashes and a particular data write was not completed. The logged write request can be used in conjunction with a mirrored, multi-pathed or otherwise redundant data storage volume to enable rapid data recovery. One solution involves maintaining an independent log in the switch for each DPC in the switch and using a mirrored storage volume for data redundancy. However, the number of DPCs in the switch may change dynamically. In addition, maintaining an independent log in the switch for each DPC wastes often scarce memory resources in the switch (and each DPC). Moreover following the latter method complicates the recovery process, as each independent log needs to be OR'ed before recovery can begin. A failure of a single log may also result in all other logs being rendered useless as a full recovery may be needed.

Accordingly, there exists a need in the art for a method and apparatus for logging write requests to a storage volume in a network data switch without maintaining an independent log for each DPC.

SUMMARY OF THE INVENTION

A method and apparatus for logging write requests to a storage volume in a network data switch is described. In one embodiment, a switch component in a switch receives a write request from a host server. The write request is associated with a destination in the storage volume. A logging element is identified that is associated with the destination of the write request. In one embodiment, the logging element comprises a switch component in the switch (e.g., a virtualization card). Alternatively, the logging element may comprise dedicated logging circuitry in the switch. The identified logging element then logs a write intent for the destination volume in a log.

BRIEF DESCRIPTION OF DRAWINGS

The following detailed description makes reference to the accompanying drawings which are now briefly described.

While the invention is described herein by way of example using several embodiments and illustrative drawings, those skilled in the art will recognize that the invention is not limited to the embodiments of drawing or drawings described. It should be understood that the drawings in detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to.

DETAILED DESCRIPTION OF THE INVENTION

Figure 1:
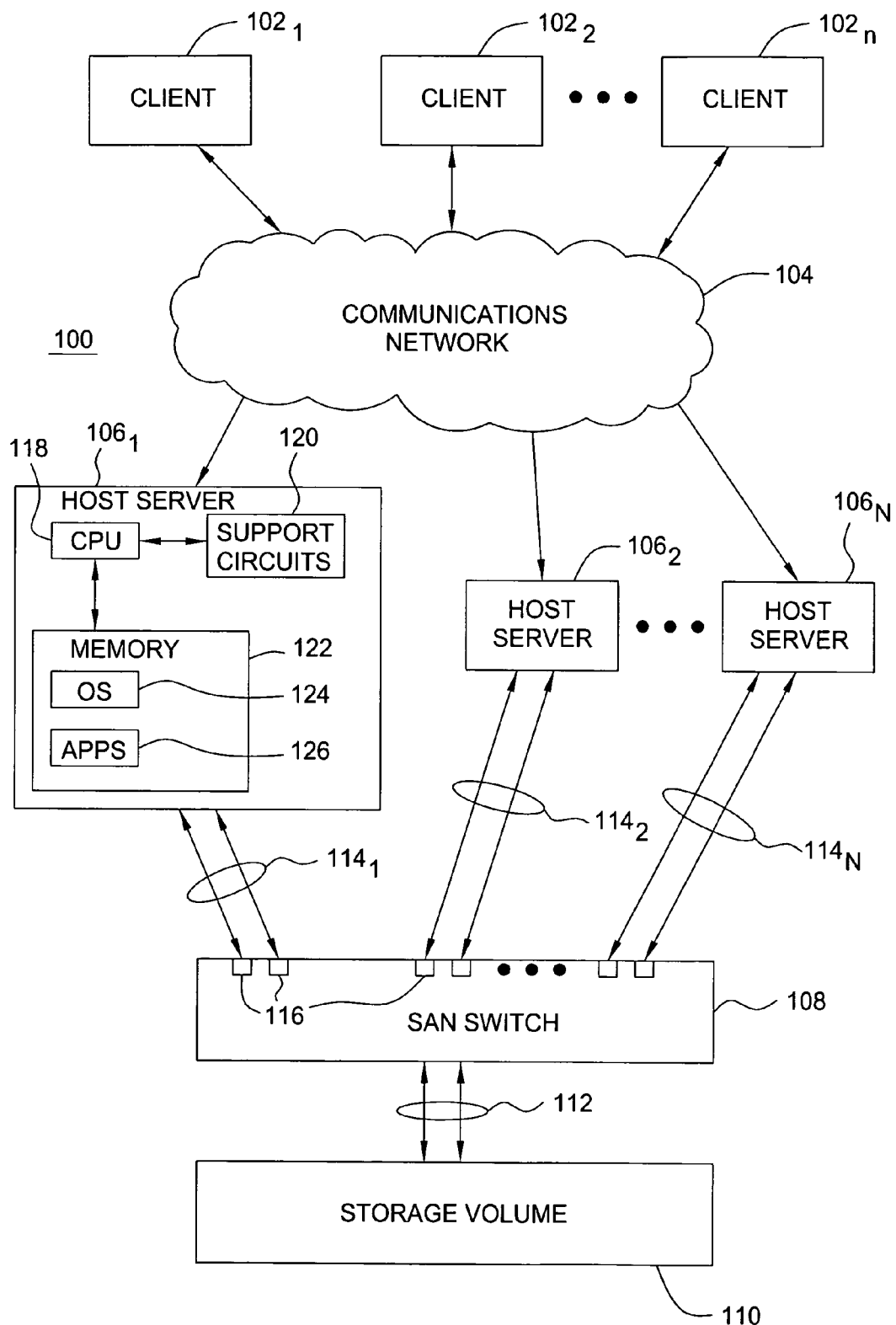
FIG. 1 depicts a computer network in which the embodiments of the present invention may be utilized.

FIG. 1 depicts a computer network 100 in which the embodiments of the present invention may be utilized. This figure only portrays one variation of the myriad of possible network configurations. For example, FIG. 1 could have depicted more than one storage area network (SAN) switch 108 and a plurality of storage volumes 110. For simplicity and clarity, one SAN switch 108 and one storage volume 110 are depicted and described below. The invention, as shall be discussed below, relates to a method and apparatus for logging write requests in a SAN switch 108 that connects host servers 106 to a storage volume 110.

The computer network 100 comprises a set of client computers $102_1$ through $102_N$ (collectively referred to as client computers 102) that are connected to one another through a conventional data communications network 104. A set of host servers $106_1$ through $106_M$ (collectively referred to as host servers 106) is coupled to the communication network 104 to supply application and data services, as well as other resource services, to the clients 102. The host servers 106 are coupled to a storage volume 110 via a network data switch 108 (also referred to as "switch 108").

Each of the host servers 106 comprises at least one central processing unit (CPU) 118, support circuits 120, and memory 122. For purposes of clarity by example, only the host server $106_1$ is shown in detail. The CPU 118 may comprise one or more conventionally available microprocessors. The support circuits 120 are well known circuits used to promote functionality of the CPU 118. Such circuits include, but are not limited to, a cache, power supplies, clock circuits, input/output (I/O) circuits, and the like. The memory 122 may comprise random access memory (RAM), read only memory (ROM), removable disk memory, flash memory, and various combinations of such memory devices. The memory 122 is sometimes referred to as "main memory" and may, in part, be used as cache memory or buffer memory. The memory 122 generally stores an operating system 124 and various forms of application software 126. The operating system 124 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The SAN switch 108 is designed to couple I/O ports $114_1$ through $114_M$ of the host servers $106_1$ through $106_M$, respectively, to I/O ports 112 of the storage volume 110. The storage volume 110 generally comprises one or more disk drives, or disk drive arrays, that are used as a mass storage device for the host servers 106. The host servers 106 are coupled to the SAN switch 108 through a plurality of switch ports 116 (also referred to as "ports 116"). Notably, each of the host servers 106 is coupled to the switch 108 using two of the ports 116 to establish two data pathways (either an active/standby configuration or an active/active configuration). Such arrangements provide either a high availability pathways (active/standby) or load balancing (active/active) pathways for information to flow between the storage volume 110 and the host servers 106.

Figure 2:
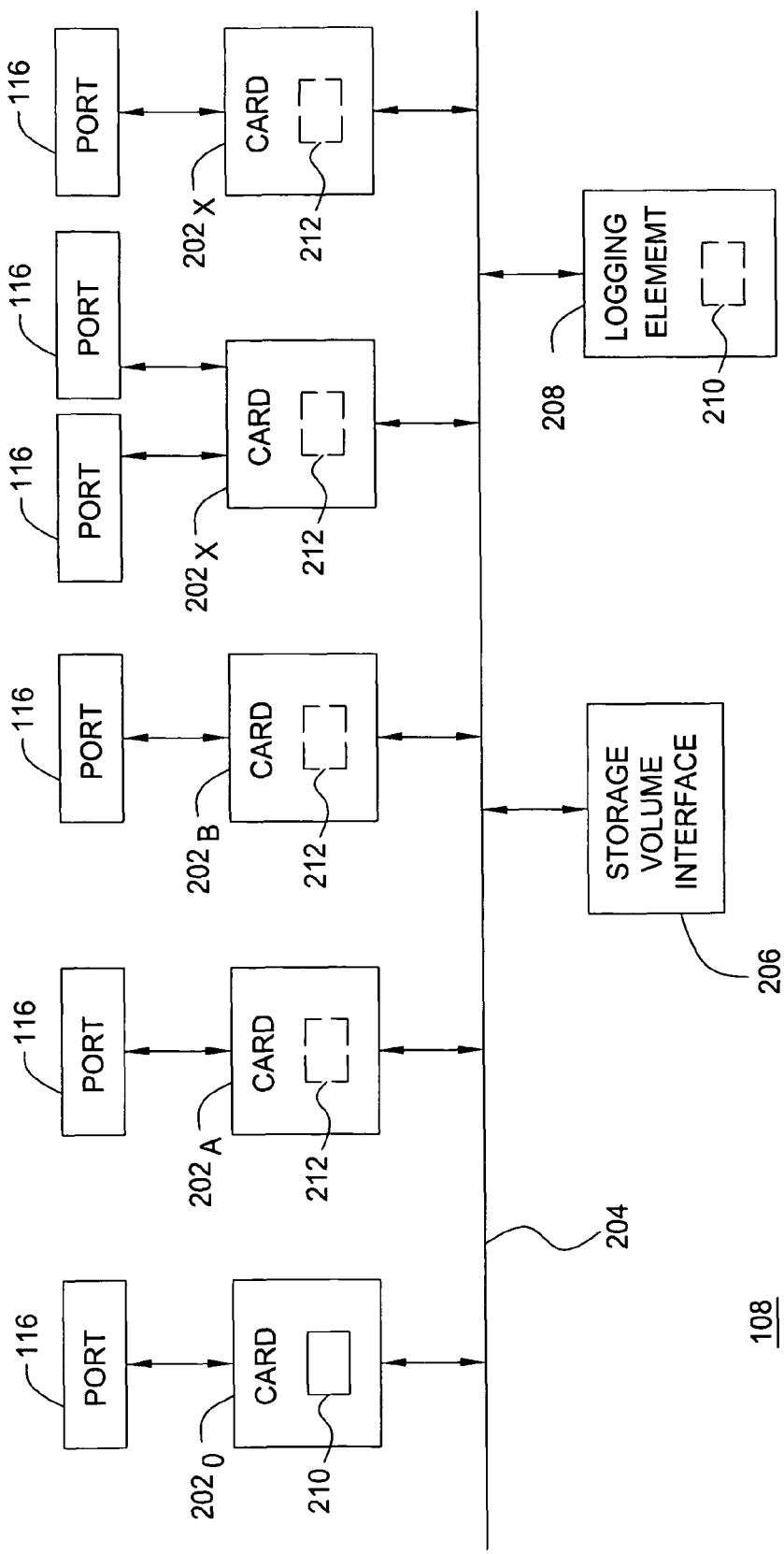
FIG. 2 is a block diagram depicting an exemplary embodiment of a network data switch shown in FIG. 1.

FIG. 2 is a block diagram depicting an exemplary embodiment of the network data switch 108 of FIG. 1. Elements of FIG. 2 that are the same or similar to those of FIG. 1 are designated with identical reference numerals. The switch 108 comprises a plurality of virtualization cards $202_O$, $202_A$, $202_B$, and $202_X$ (generally referred to as a "virtualization card 202" or "virtualization cards 202"), a switching fabric 204, (i.e., any form of DPC to DPC communication structure) and a storage volume interface 206. For purposes of clarity, only five virtualization cards 202 are shown. Each virtualization card 202 forms a DPC. A first interface of each of the virtualization cards 202 is coupled to one or more of the switch ports 116. A second interface of each of the virtualization cards 202 is coupled to the switching fabric 204. The storage volume interface 206 is coupled to the switching fabric 204 and is configured for communication with one or more of storage volumes 110.

Each of the virtualization cards 202 is configured to provide virtualization services for the storage volume 110. Notably, each of the virtualization cards 202 may include volume manager software that, when executed, provides virtualization services to one or more of the host servers 106. This volume manager software contains a virtualization engine that supports the use of virtual logic unit numbers (VLUNs). Some of the virtualization cards 202 may be arranged into pairs, known as failover pairs (active and standby). For example, virtualization cards $202_A$ and $202_B$ comprise a failover pair, which is associated with one of the host servers 106. The virtualization card $202_B$ is used to form a standby card to handle virtualization of the storage volume 110 in case the active virtualization card $202_A$ fails.

In an active/active configuration, both cards 202 in a pair are active and share the traffic load between the storage volume 110 and the host server 106. The traffic can be adjusted to balance the traffic loading through the switch 204. If a card 202 fails, the traffic for the failed switch can be moved to another card 202.

With reference to FIGS. 1 and 2, under normal operation, each host server 106, in support of its operating system 124 and application programs 126, will send read/write requests to the switch 108. These requests are addressed using a virtual logic unit number (VLUN). These requests are then routed by the volume manager software of a virtualization card 202 to the storage volume 110. The storage volume 110 appropriately responds to the request for reading and writing of information. The volume manager software establishes VLUNs for each of the active virtualization cards 202. The VLUNs enable the volume manager software to route the read/write requests to any number of physical LUNs associated with the storage volume 110, while the host servers 106 need only address a single VLUN.

In accordance with the invention, the switch 108 is configured to log write requests issued by the host servers 106. A write request may be logged as an intention to write or "write intent", which is an indication that a given one of the host servers 106 intends to write data to a particular destination in the storage volume 110. A destination may be defined to be any number of blocks, sectors, regions, and the like that define the storage volume 110. In one embodiment, one or more of the virtualization cards 202 are configured to store a log for logging write intents ("owner virtualization cards"). For example, a single owner virtualization card may be associated with the entire storage volume 110. Alternatively, each of a plurality of owner virtualization cards may be associated with a particular range of destinations in the storage volume 110. In any case, the remaining ones of the virtualization cards 202 that are not owners are configured to report write intents to these one or more owner virtualization cards for logging. In this manner, an independent log is not required for each of the virtualization cards 202, which allows for efficient use of potentially scarce memory resources of the virtualization cards 202.

For example, the virtualization card $202_O$ is configured to store a log 210 for the storage volume 110 (i.e., the virtualization card $202_O$ is the owner responsible for the storage volume 110). The virtualization cards $202_A$, $202_B$, and $202_X$ (i.e., the non-logging virtualization cards) are configured to report any write intents for destinations of the storage volume 110 to the virtualization card $202_O$ through the switching fabric 204. In one embodiment, the non-logging virtualization cards report write intents to an owner virtualization card via a message sent in accordance with a particular signaling protocol implemented by the switch 108. For example, the switch 108 may comprise a fibre channel switch, and the message may be sent using a layer-2 fibre channel signaling protocol. By using a signal protocol associated with the switch 108 (e.g., the layer-2 fibre channel signaling protocol), write intents may be reported to owner virtualization cards in other ones of the switches 108 in the computer network 100, as well as within a given switch 108.

Selecting the card 202 that is designated the "owner" may be static or dynamic. In a static operation, the owner card is selected at switch initialization and remains the owner unless that card fails. Alternatively, the owner designation may be dynamically applied based upon the number of write requests handled by the cards, e.g., the card with the highest number of write requests is designated the owner card. In this manner, the highest traffic will result in most of the logging to occur locally without requiring logging information transfer between cards.

In another embodiment, rather than designating one or more of the virtualization cards 202 as owners for the storage volume 110, separate logging circuits may be employed to store write-intent logs. For example, instead of having the virtualization card $202_O$ store the log 210, a logging circuit 208 may be coupled to the switching fabric 204 and may store the log 210. Each of the virtualization cards 202 may then report write intents to the logging circuit 208 over the switching fabric 204 (e.g., using a signaling protocol, as discussed above). In general, the term "logging element", as used herein, is meant to encompass both a separate logging circuit (e.g., the logging circuit 208) and a virtualization card or switch component that performs write-intent logging.

In another embodiment, each of the virtualization cards 202 that is not designated as an owner may store a local cache 212 of write intents (e.g., the virtualization cards $202_A$, $202_B$, and $202_x$). The local cache 212 comprises a log that is local to the particular virtualization card that maintains the local cache 212. In this manner, each of the virtualization cards 202 not designated as an owner may first check the local cache 212 to determine whether a write intent has been logged for a particular destination before reporting such write intent to a logging element (e.g., the virtualization card $202_O$ or the logging element 208). This avoids unnecessary signaling between virtualization cards or between virtualization cards and a logging circuit.

From time to time, the log 210 may be "cleared" in that destinations marked with write intents are cleared. For example, the log 210 may be cleared periodically in accordance with a schedule. Alternatively, the log 210 may be cleaned in response to a user command or after a write request is completed. If any of the virtualization cards 202 maintain a local cache of write intents, such local cache is also cleared in response to the cleaning of the log 210.

Figure 3:
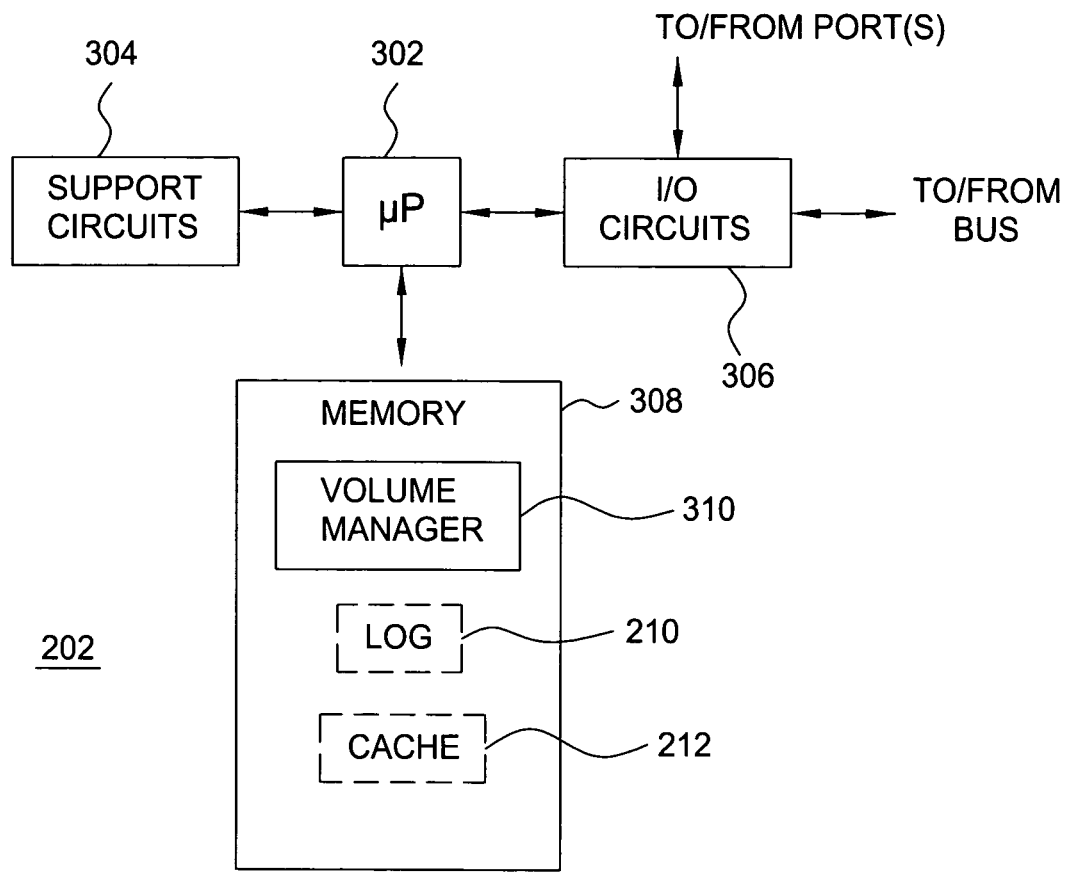
FIG. 3 is a block diagram depicting an exemplary embodiment of a virtualization card shown in FIG. 2.

FIG. 3 is a block diagram depicting an exemplary embodiment of a virtualization card 202 of FIG. 2. Elements of FIG. 3 that are the same or similar to those of FIG. 2 are designated with identical reference numerals. The virtualization card 202 comprises a microprocessor 302, support circuits 304, I/O circuits 306, and memory 308. The microprocessor 302 may be an application specific integrated circuit (ASIC). The circuitry used as the support circuits 304 and the memory 308 is conventional and is similar to the arrangement described above for each of the host servers 106. The memory 308 is generally RAM and/or ROM. To support the operation and functionality of the present invention, the memory 308 may be partially used to store the write-intent log 210 if the virtualization card 202 is an owner card. Alternatively, the memory 308 may be partially used to store a local cache 212 of write intents if the virtualization card 202 is not an owner card. The memory 308 also stores volume manager software 310 that, when executed, provides virtualization services to one or more of the host servers 106. This volume manager software 310 contains a virtualization engine that supports the use of VLUNs.

To add redundancy, the logged information may also be backed up to either persistent or non-persistent memory comprising NVRAM, a memory card, a disk drive, a storage volume, and the like. Such redundancy enables a failed logging element to be rebuilt using a new logging element or a logging element on another card. The back up location may be on a card that is different from the card comprising the logging element, within the storage volume 110, or in any storage device that is separate from the switch or storage volume.

Figure 4:
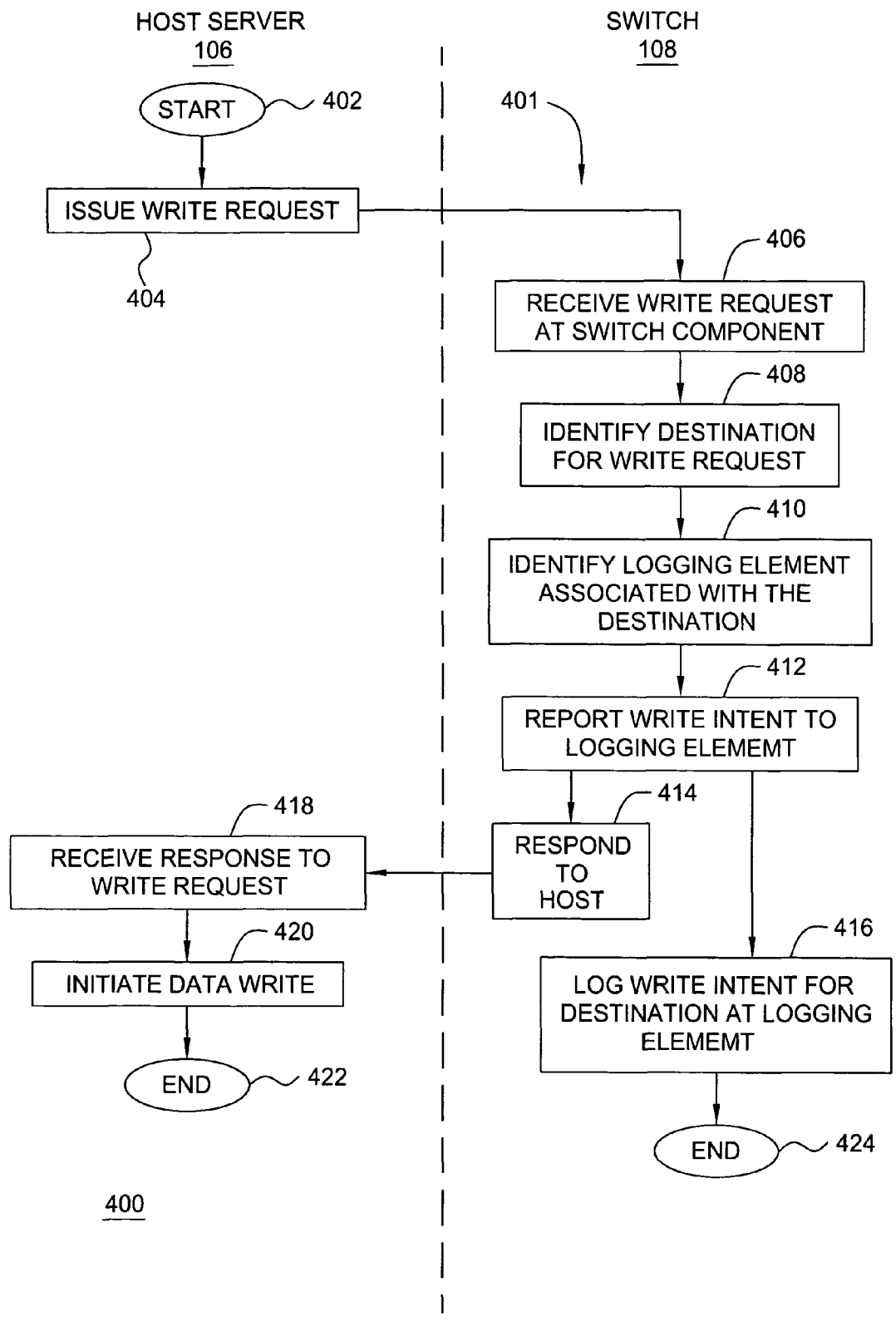
FIG. 4 is a flow diagram depicting an exemplary embodiment of a method for logging write requests to a storage volume in accordance with the invention.

FIG. 4 is a flow diagram depicting an exemplary embodiment of a method 400 for logging write requests to a storage volume in accordance with the invention. Aspects of the method 400 may be understood with reference to FIGS. 1 and 2. The method 400 is executed by both a host server 106 and the switch 108. The method 400 begins at step 402. At step 404, a write request is issued by the host server 106. The method 400 proceeds to execute a method 401 for processing a write request in the switch 108.

Notably, at step 406, the write request is received at a switch component (e.g., virtualization card 202) in the switch 108. At step 408, a destination within the storage volume 110 is identified for the write request. The destination may be any portion of the storage volume 110, such as a sector or region. At step 410, a logging element is identified that is associated with the identified destination of the write request. That is, a logging element is identified that is an owner with respect to the destination in the storage volume 110. As described above, the logging element may be another switch component (e.g., virtualization card) in the switch 108, or a separate logging circuit within the switch 108.

At step 412, the switch component that received the write request reports a write intent for the destination to the identified logging element. In one embodiment, a write intent may be reported to the logging element using a signaling protocol, such as a layer-2 fibre channel signaling protocol. In one embodiment, the logging element comprises a switch component in the switch 108. In some cases, the logging switch component itself may receive the write request from the host server 106 and that switch component may be the owner with respect to the particular destination of the write request. In such cases, the logging switch component reports a write intent locally, rather than externally to another logging element.

At step 414, the switch component that received the write request responds to the host server 106. At step 416, the identified logging element logs the write intent for the identified destination. In one embodiment, the logging element maintains a log comprising a bitmap associated with a plurality of destinations in the storage volume 110. That is, the logging element is an owner for a range of destinations in the storage volume. A write intent may be logged in the bitmap by toggling a bit therein assigned to the particular destination. Instead of a bitmap the logged information may have other formats. For example, the logged information may be identified by a volume destination defined by a start location and length of the block of data intended to be written.

The method 401 in the switch 108 ends at step 424. At step 418, the host server 106 receives the response to the write request. At step 420, the host server 106 initiates a data write. The method 400 in the host server 106 ends at step 422.

Figure 5:
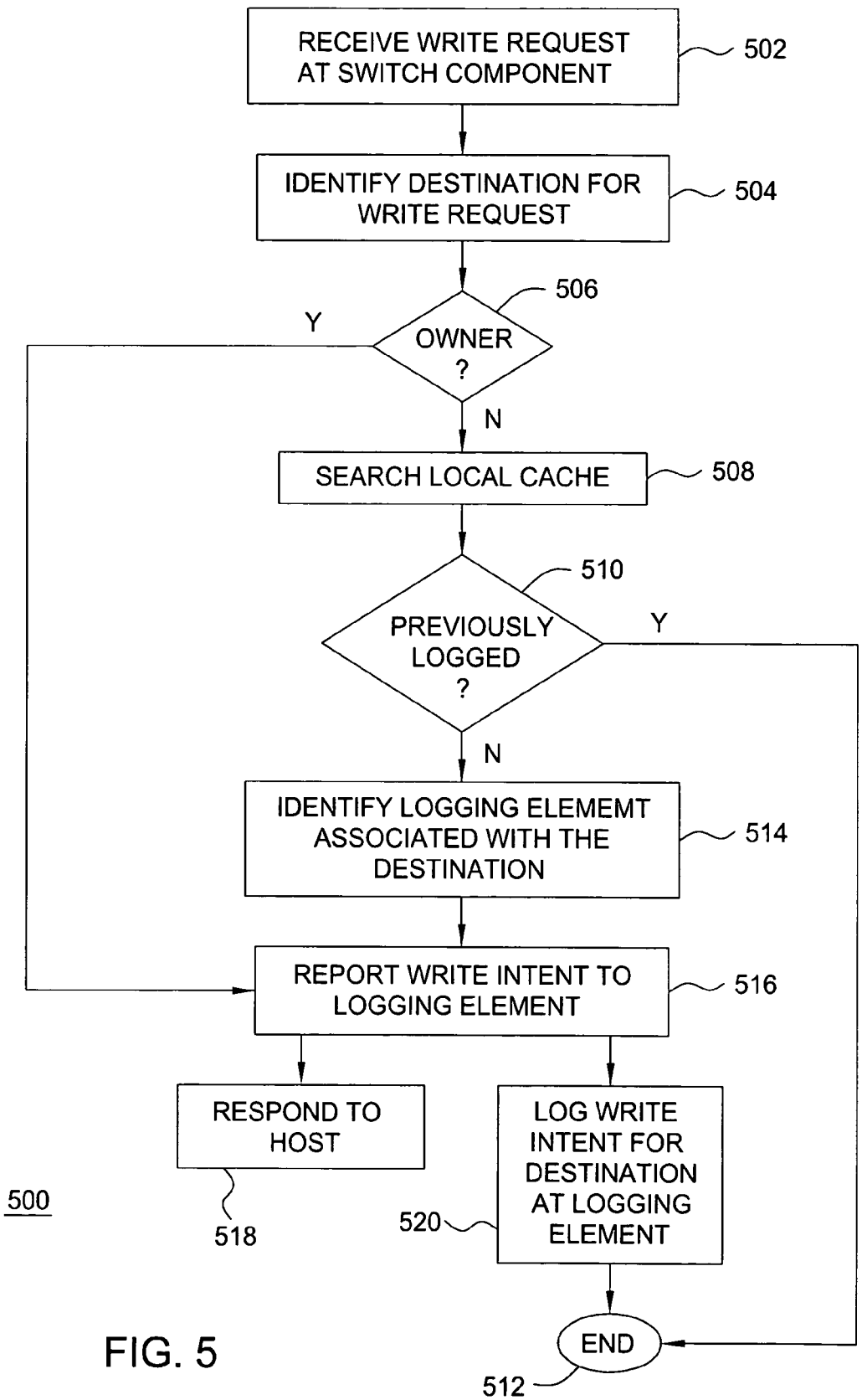
FIG. 5 is a flow diagram depicting another exemplary embodiment of a method for processing write requests in a network data switch in accordance with the invention.

FIG. 5 is a flow diagram depicting another exemplary embodiment of a method 500 for processing write requests in a network data switch in accordance with the invention. The method 500 may be performed in place of the method 401 described above with respect to FIG. 4. The method 500 begins at step 502, where a write request is received at a switch component. At step 504, a destination within the storage volume 110 is identified for the write request. At step 506, a determination is made as to whether the switch component is a logging element with respect to the identified destination. If so, the method 500 proceeds to step 516. If not, the method 500 proceeds to step 508, where a local cache in the switch component is searched.

At step 510, a determination is made as to whether a write intent for the identified destination has been previously logged. If so, the method 500 ends at step 512. That is, no message is required to be reported, since a write intent for the identified destination has already been reported. If a write intent for the identified destination has not been previously logged, the method 500 proceeds to step 514. At step 514, a logging element is identified that is associated with the identified destination of the write request. At step 516, the switch component reports a write intent for the destination to the identified logging element. As discussed above, such reporting may require transmission of a message to the logging element from the switch component. Alternatively, the switch component itself may be a logging element, in which case the write intent is reported locally within the switch component. At step 518, the switch component responds to the host server 106. At step 520, the identified logging element logs the write intent for the identified destination. The method 500 ends at step 512.

While the foregoing is directed to illustrative embodiments of the present invention, other and further embodiments of the invention may be devised without departing from the basic scope thereof, and the scope thereof is determined by the claims that follow.

What is claimed is:

1. A method of logging write requests to one or more storage volumes coupled to a switch comprising a plurality of virtualization cards and a logging element, comprising:
   receiving, at a first virtualization card of the plurality of virtualization cards, a write request from a host server, the write request being associated with a destination in the one or more storage volumes, wherein
      the switch couples one or more host server input/output ports to one or more input/output ports of the one or more storage volumes, and
      the destination in the one or more storage volumes is configured to log a plurality of write requests received by a plurality of virtualization cards, wherein
      the plurality of write requests are received from the host server,
      each of the plurality of virtualization cards are configured to operate as one of a plurality of controllers by virtue of being configured to determine the route by which data traverses a switching fabric connecting the one or more storage volumes and the host server, and
      the first virtualization card of the plurality of virtualization cards is associated with a distinct write request of a plurality of write requests;
   selecting the logging element, wherein
      the logging element is selected in response to being associated with the destination, wherein the selecting is performed by the first virtualization card, and
      the logging element is designated statically during switch initialization and is configured to manage a log for said destination, said identified logging element being selected from a plurality of available logging elements; and
   sending a message from the first virtualization card to the logging element in response to the selecting the logging element and the receiving the write request, wherein the message comprises information identifying a write intent for the destination for inclusion in the log; and
   providing a response to the write request from the first virtualization card to the host server.

2. The method of claim 1, wherein the sending the message comprises:
   sending the message using a signaling protocol.

3. The method of claim 2, wherein the switch comprises a fibre channel switch, and wherein the signaling protocol comprises a layer-2 fibre channel signaling protocol.

4. The method of claim 1, wherein the logging element is included in one of the plurality of virtualization cards other than the first virtualization card.

5. The method of claim 1, further comprising:
   caching, at the first virtualization card, the write intent for the destination.

6. The method of claim 1, further comprising:
   searching a cache in said first virtualization card for a previously logged write intent for the destination; and
   performing the selecting and the sending in response to absence of the previously logged write intent for the destination in the cache.

7. The method of claim 1, wherein the log comprises a bitmap associated with a plurality of destinations of the one or more storage volumes, the plurality of destinations including the destination.

8. The method of claim 1, wherein the log comprises information identifying a start location within the one or more storage volumes and a length of the data associated with the write request.

9. The method of claim 1, further comprising:
   repeating the receiving, selecting, and sending for one or more additional write requests; and
   clearing the log of each logged write intent.

10. The method of claim 8, wherein the log is cleared periodically.

11. The method of claim 1, further comprising:
   creating a back up copy of the log to be stored remote from the logging element.

12. A switch for controlling access to one or more storage volumes, comprising:
   a plurality of virtualization cards, wherein
      the switch couples one or more host server input/output ports to one or more input/output ports of the one or more storage volumes via the virtualization cards,
      a first virtualization card of the plurality of virtualization cards is configured to receive a write request from a host server, wherein the write request is associated with a destination in the one or more storage volumes,
      the first virtualization card is configured to select a logging element from a plurality of available logging elements, in response to the logging element being associated with the destination,
      the first virtualization card is configured to send a message to the logging element identifying a write intent for inclusion in a log for the destination in response to selection of the logging element,
      the first virtualization card is configured to send a response to the write request to the host server,
      the plurality of virtualization cards operate as controllers to determine the route by which data traverses a switching fabric connecting the one or more storage volumes and the host server, and
      the destination in one or more storage volumes logs a plurality of write request received by a plurality of virtualization cards from the host server, wherein the first virtualization card of the plurality of virtualization cards is associated with a distinct write request of a plurality of write requests;

the logging element associated with the specific destinations, wherein
the logging element is designated statically during initialization of the switch, and
the logging element is configured to manage the log and to store write intents in the log for the destination in response to the write requests received by more than one of the plurality of virtualization cards.

13. The switch of claim 12, wherein the first virtualization card is configured to send the message to the logging element using a signaling protocol.

14. The switch of claim 13, wherein the switch comprises a fibre channel switch, and wherein the signaling protocol comprises a layer-2 fibre channel signal protocol.

15. The switch of claim 12, wherein the first includes a memory for caching write intents.

16. The switch of claim 15, wherein the first virtualization card is configured to search the memory for a previously logged write intent for the destination and to send the message to the logging element in response to absence of the previously logged write intent for the destination in the memory.

17. The switch of claim 12, wherein the log comprises a bitmap.

18. The switch of claim 12 wherein the log comprises information identifying a start location and a length of the data associated with the write request.

19. A computer network, comprising:
a host server for issuing a write request;
one or more storage volumes for storing data written by the host server; and
a switch, coupled to the host server and the one or more storage volumes, the switch including:
a plurality of virtualization cards,
a first virtualization card in the plurality of virtualization cards being configured to receive the write request from the host server, the write request being associated with a destination in the one or more storage volumes, wherein
the first virtualization card is configured to select a logging element from a plurality of available logging elements, in response to the logging element being associated with the destination,
the first virtualization card is configured to send a message to the logging element identifying a write intent for inclusion in a log for the destination in response to selection of the logging element,
the first virtualization card is configured to send a response to the write request to the host server,
the switch couples one or more host server input/output ports to one or more input/output ports of the one or more storage volumes via the virtualization cards, and
the plurality of virtualization cards operate as controllers to determine the route by which data traverses a switching fabric connecting the one or more storage volumes and the host server; and
the destination in one or more storage volumes logs a plurality of write request received by a plurality of virtualization cards from the host server, wherein
the first virtualization card of the plurality of virtualization cards is associated with a distinct write request of a plurality of write requests;
the logging element, wherein
the logging element is designated statically during initialization of the switch, wherein and
the logging element is configured to manage the log for the destination and to store write intents in the log in response to write requests received by more than one of the virtualization cards in said plurality of virtualization cards.

20. Apparatus for logging write requests to one or more storage volumes in a switch comprising a plurality of virtualization cards and a logging element, comprising:
means for receiving, at a first virtualization card of the plurality of virtualization cards, a write request from a host server, the write request being associated with a destination in the one or more storage volumes, wherein
the switch couples one or more host server input/output ports to one or more input/output ports of the one or more storage volumes via the virtualization cards, and
the plurality of virtualization cards operate as controllers to determine the route by which data traverses a switching fabric connecting the one or more storage volumes and the host server, and
the destination in one or more storage volumes logs a plurality of write request received by a plurality of virtualization cards from the host server, wherein
the first virtualization card of the plurality of virtualization cards is associated with a distinct write request of a plurality of write requests;
means for selecting the logging element, wherein
the logging element is selected in response to being associated with the destination, wherein
the means for selecting are included in the first virtualization card, and
the logging element is designated statically during switch initialization and is configured to manage a log for said destination, said identified logging element being selected from a plurality of available logging elements;
means for sending a message from the first virtualization card to the logging element in response to selection of the logging element, wherein
the message comprises information identifying a write intent for inclusion in the log; and
means for providing a response to the write request from the first virtualization card to the host server.

* * * * *